Patented May 23, 1933

1,910,444

UNITED STATES PATENT OFFICE

KENNETH C. NICHOLSON, OF NIAGARA FALLS, NEW YORK, ASSIGNOR TO THE CARBORUNDUM COMPANY, OF NIAGARA FALLS, NEW YORK, A CORPORATION OF PENNSYLVANIA

PROCESS OF MAKING ABRASIVE MATERIALS

No Drawing.    Application filed February 13, 1931.    Serial No. 515,649.

This invention relates to the manufacture of new and improved abrasive material, and has for its principal objects the provision of abrasive articles adapted to provide greater efficiency in polishing and grinding operations and methods of manufacturing the new and improved abrasive material. Other objects of the invention will be apparent from the following specification and claims.

Abrasive grains usually are used for only a small portion of the time that they might be used by virtue of their toughness, hardness, and sharpness. This failure to utilize more fully the superior properties of manufactured abrasive grains arises from the difficulty of holding in place or bonding the grains to the degree required to secure full efficiency in grinding. The refuse from grinding and polishing operations has been found to contain large percentages of granular abrasive material that became detached from the abrasive article long before the full use of that granular material had been secured. The abrasive material is recovered from some grinding operations and used again, but this practise is a makeshift.

Attempts have been made in the past to increase the adhesion between the granular abrasive material and the bond by causing the surfaces of the abrasive grains to be pitted, as disclosed in the United States patents to Higgins, et al. (No. 944,436) and Hartmann (Nos. 1,482,792 and 1,482,793), but while such practise has resulted in some improvement it has left much to be desired.

I have found that the adhesion between grain and bond can be increased greatly by causing the surfaces of the abrasive grains to become roughened by prominences attached to the said surfaces. By my process, the surfaces of the grains are caused to lose their glass-like smooth surfaces and acquire rough, lusterless surfaces. These rough, lusterless surfaces, in contrast with the bright, smooth surfaces of the heretofore known manufactured abrasive granules, enable the bonding material to grip the grains firmly and adhere tenaciously thereto, whereas the prior methods of increasing the grinding efficiency have not materially affected the adhesion of the bond to the grain but have permitted the bond to interlock at a relatively few points of depression in the surfaces of the grains.

One method by which I provide abrasive grains to which a binder, such as glue, will adhere with greater tenacity than has been known heretofore, comprises the following treatment.

The granular abrasive material is wetted with a thin slip or slurry of a fusible material such as various kinds of clay, bentonite, talc, cryolite, fluorspar, or feldspar or mixtures thereof, in such a way that each grain becomes coated without there being an excess of slip or slurry to fill the voids between the grains. One way of securing this degree of wetting comprises stirring the grain and slip together until all of the grains have become wetted and then removing the excess slip before permitting the water to evaporate to such a degree that the grains or portions of grains become covered with a dry or substantially dry coating. The removal of the excess slurry takes place more rapidly if forced drainage, such as the use of a vacuum, is employed.

Fluxing materials, such as borax, alkaline silicates, halides, or hydroxides and others, may be used in various amounts to lower the fusion point of the coating material or to attach infusible material to the grains. Temporary binders, such as dextrin, powdered gums or sulphite-cellulose liquor residues, may be added to the coating material to increase the adhesiveness of the coating before it is burned.

A specific example, by which I intend to illustrate my invention and not to limit it, consists in stirring together abrasive grains such as fused alumina or silicon carbide, and a slurry containing approximately five (5) per cent Albany clay, two (2) per cent borax and ninety-three (93) per cent water. When each abrasive granule has been wetted, I cause the excess slurry to drain away, after which I dry the coated grains at a temperature of approximately one hundred and fifty (150) degrees centigrade. I then subject the coated grains to an elevated temperature for a period of sufficient duration to permit the clay to fuse or sinter onto the abrasive grains. In the case of the example given above, I find that the mixture of clay and borax becomes fused to the abrasive grains when the coated grains are brought to a temperature of approximately nine hundred (900) degrees centigrade, without causing the granules to become bonded one to another.

After the abrasive particles have been subjected to the elevated temperature for the desired length of time, they are allowed to cool to approximately two hundred and fifty (250) degrees centigrade, and then treated to remove the loose foreign material remaining on their surfaces.

One method that I have found effective for the removal of the foreign material consists in treating the grain by agitation in water. The grain resulting from the above process is ready for use after being dried at a temperature, for example, above approximately three hundred (300) degrees centigrade. Drying may be carried on at lower temperatures when high capillarity is not required.

As previously stated, granular abrasive material treated in a manner herein described has rough, although not necessarily pitted, surfaces, and is not transformed into a bonded mass because of the small quantity of vitrifiable material left after the already dilute dispersion is removed from voids between the granules. This rough surface grain is characterized by its resistance to movement or flow under localized pressure as contrasted with the ease with which untreated grains or the pitted grains of the prior art may be caused to flow. This rough surface grain therefore is said to "pack" well. I have found that granular abrasive material treated in accordance with my invention "packs" or resists movement from localized pressure better than grain of the same screen analysis but treated according to the methods used heretofore.

A granular material that "packs" well is greatly desired by those who use abrasive grains in polishing operations because it enables them to apply it more readily to set-up wheels, which are wood or canvas disks to which the abrasive granules are attached by glue. Grain that does not "pack" well moves away from the set-up wheel as the latter is rolled through the trough containing the abrasive grain, and thus it is difficult to coat the face of the wheel with the abrasive grain. Grain that "packs" well, on the other hand, remains in place in the trough as the wheel is rolled through, whereby the grain becomes embedded in the glue instead of forming a loose coating on the surface of the glue as is the case when grain that does not "pack" is used.

This characteristic of "packing" can be determined quantitively by subjecting the granular material to a penetration test somewhat like that used for determining the consistency of greases, asphalts and similar materials. In determining the "packing" quality of a given granular material, the grains first are caused to settle into such positions that maximum density; i. e., minimum volume, per unit of weight, results, and then a conical weight is permitted to penetrate the mass by virtue of its weight. The depth to which the cone penetrates is accurately determined and serves as a measure of the resistance of the granular material to move when localized pressure is applied.

While specific examples of materials, concentrations, temperatures and other features of methods of treating granular abrasive material have been given, my invention is not thus limited but may be practised within the scope of the appended claims.

Having thus described my invention, what I claim is:

1. Abrasive granules with roughened surfaces, said granules being characterized by the presence of prominences of vitrified material attached to their respective surfaces without uniting them into aggregates.

2. Abrasive granules with roughened surfaces, said granules being characterized by the presence of a film of vitrified particles on the surface of each granule and each granule being free from all adjacent granules.

3. In the manufacture of abrasive granules, the steps comprising wetting abrasive granules with an aqueous dispersion of vitrifiable material of a lower concentration than is necessary to cause agglomeration of the granules upon vitrification, removing the excess dispersion from the voids between the granules, removing the water from the dispersion remaining on the granules, and heating the residual mixture to the vitrification point of the vitrifiable material.

4. In the manufacture of abrasive granules, the steps comprising wetting the abrasive granules with an aqueous non-agglomerating dispersion containing seven per cent of suspended vitrifiable material, removing the dispersion from the voids between the granules, removing the water from the dispersion remaining on the granules, and heating the residual mixture to the vitrification point of the vitrifiable material.

5. In the manufacture of abrasive granules, the steps comprising mixing the abrasive granules with a non-agglomerating slurry of vitrifiable material and heating the mixture to vitrify the coatings of vitrifiable material on the respective granules.

In testimony whereof I affix my signature.

KENNETH C. NICHOLSON.